United States Patent [19]

Nakayama et al.

[11] Patent Number: 5,161,236
[45] Date of Patent: Nov. 3, 1992

[54] VIDEO SIGNAL PROCESSING APPARATUS FOR SYNTHESIZING VIDEO SIGNAL WITH MULTIPLE COLOR PATTERN SIGNAL

[75] Inventors: Satoshi Nakayama, Yokohama; Teruo Hieda, Kawasaki, both of Japan

[73] Assignee: Canon Kabushiki Kaisha, Tokyo, Japan

[21] Appl. No.: 669,495

[22] Filed: Mar. 14, 1991

[30] Foreign Application Priority Data

Mar. 22, 1990 [JP] Japan .................................. 2-72482

[51] Int. Cl.⁵ .............................................. H04N 9/74
[52] U.S. Cl. ........................................ 358/22; 358/183
[58] Field of Search ............................ 358/22, 81, 183

[56] References Cited

U.S. PATENT DOCUMENTS

| | | | |
|---|---|---|---|
| 4,334,245 | 6/1982 | Michael | 358/183 |
| 4,613,906 | 9/1986 | Tanaka et al. | 358/183 |
| 4,999,709 | 3/1991 | Yamazaki et al. | 358/22 |

Primary Examiner—Howard W. Britton
Assistant Examiner—Minsun Oh
Attorney, Agent, or Firm—Robin, Blecker, Daley & Driscoll

[57] ABSTRACT

In synthesizing a binary image signal with an inputted video signal, color pattern information is generated in synchronism with the inputted video signal, and the binary image signal is colored by using the color pattern information. It becomes possible to synthesize a variety of image patterns with a video signal by using a simple circuit arrangement.

11 Claims, 3 Drawing Sheets

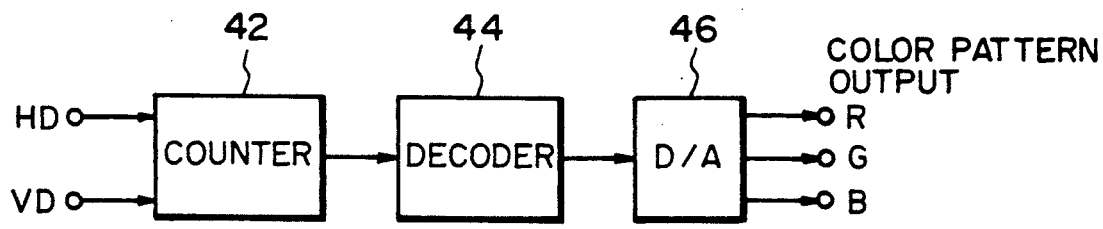
F I G. 3
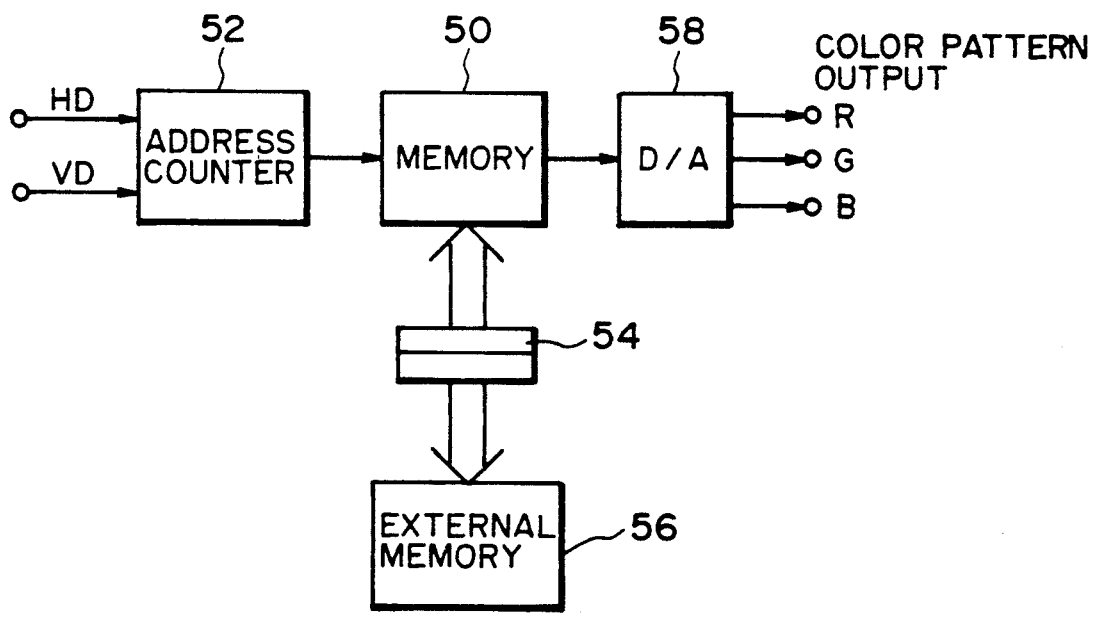
F I G. 5

VIDEO SIGNAL PROCESSING APPARATUS FOR SYNTHESIZING VIDEO SIGNAL WITH MULTIPLE COLOR PATTERN SIGNAL

BACKGROUND OF THE INVENTION

1. Field of the Invention

The present invention relates to a video signal processing apparatus, and more particularly to a video signal processing apparatus for synthesizing a video signal with a pattern signal.

2. Related Background Art

There is known a video signal processing apparatus for video camera wherein an image to be used as a title image or the like is taken in advance and stored in a dedicated memory (hereinafter called a title memory), and the image stored in the title memory is inserted into or superposed upon a newly taken image.

In a title memory of this type of video signal processing apparatus, there is stored as a binary pattern signal a luminance signal of a video signal of a taken title or the like. When a title is inserted into a newly taken image, another circuit generates one of eight color identified by a combination of red (R), green (G), and blue (B) of each one bit. This color signal is modulated with a sub-carrier, and superposed upon a white area represented by the binary luminance signal read from the title memory, to thereby obtain a video signal. Thereafter, this video signal is superposed upon a newly taken image signal Such a conventional video signal processing apparatus can display a title image having only a single color selected from eight colors or an inverted color of the selected one Therefore, there arises a problem that a synthesized pattern of a title or the like becomes monotonous.

SUMMARY OF THE INVENTION

It is an object of the present invention to solve the above-described problem.

It is another object to the present invention to provide a video signal processing apparatus capable of synthesizing a variety of pattern images by using a simple circuit arrangement.

In order to achieve the above objects, according to one aspect of this invention, there is provided a video signal processing apparatus, comprising:

(a) means for inputting a video signal;

(b) binary image generating means for generating a binary image signal;

(c) color pattern generating means for generating color pattern information in synchronism with the video signal; and (d) synthesizing means for coloring the binary image signal using the color pattern information and synthesizing the colored binary image signal with the video signal The other objects and advantages of this invention will become apparent from the following detailed description of the embodiments of this invention when read in conjunction with the accompanying drawings.

BRIEF DESCRIPTION OF THE DRAWINGS

FIG. 3 is a block diagram showing a particular circuit arrangement of the color pattern generator 16 shown in FIG. 1;

FIG. 5 is a block diagram showing another particular circuit arrangement of the color pattern generator 16 shown in FIG. 3.

DETAILED DESCRIPTION OF PREFERRED EMBODIMENT

The embodiments of this invention will be described with reference to the accompanying drawings.

Figure 1:
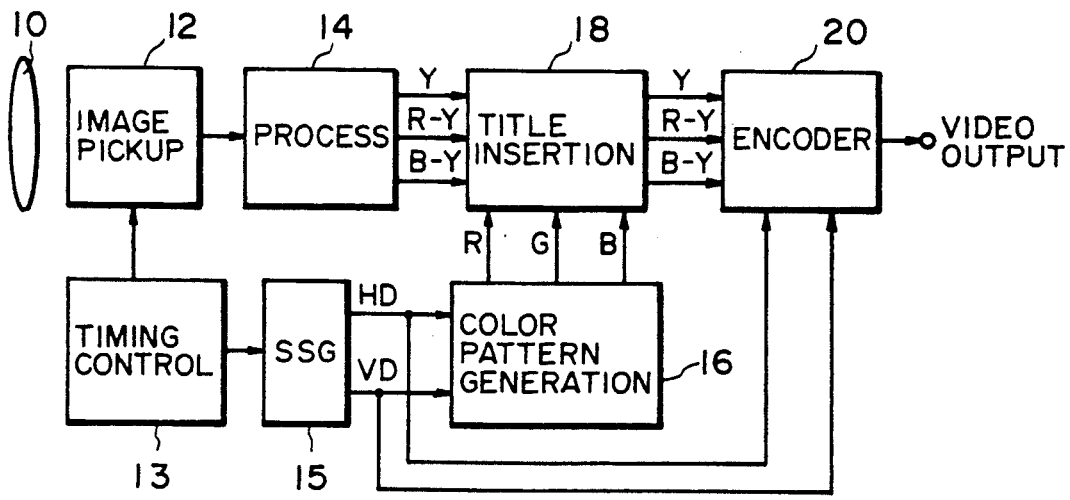
FIG. 1 is a block diagram showing the outline of a video camera according to an embodiment of this invention.

FIG. 1 is a block diagram showing the outline of the structure of a video camera according to an embodiment of this invention. An optical image of a subject taken with a taken lens 10 is converted into electrical signals by an image pickup device 12, and the electrical signals are applied to a processing circuit 14. Reference numeral 13 represents a timing controller for determining the timings of driving the image pickup device 12. In accordance with a known video signal processing method, the processing circuit derives a luminance signal Y and color difference signals R-Y and B-Y from an output of the image pickup device 12. Reference numeral 15 represents a synchro signal generator (SSG) which is controlled by the timings of driving the image pickup device 12 generated by the timing controller 13. The synchro signal generator 15 generates a horizontal synchro signal HD and a vertical synchro signal VD, in synchronism with electrical signals outputted from the image pickup device 12. Reference numeral 16 represents a color pattern generator for generating RGB signals having an optical or predetermined color pattern. A title insertion circuit 18 superposes a title image conforming with color pattern information (to be described later) generated by the color pattern generator insertion circuit 18 upon an output signal from the processing circuit 14.. As will be later described, the title insertion circuit 18 has a title memory for storing an image taken with the taking lens 10 and outputted from the processing circuit 14 in the form of a title image. An encoder 20 modulates signals Y, R-Y, and B-Y from the title insertion circuit 18 with a sub-carrier and adds synchro signals from SSG 15 to obtain a video signal as an output of the encoder 20.

Figure 2:
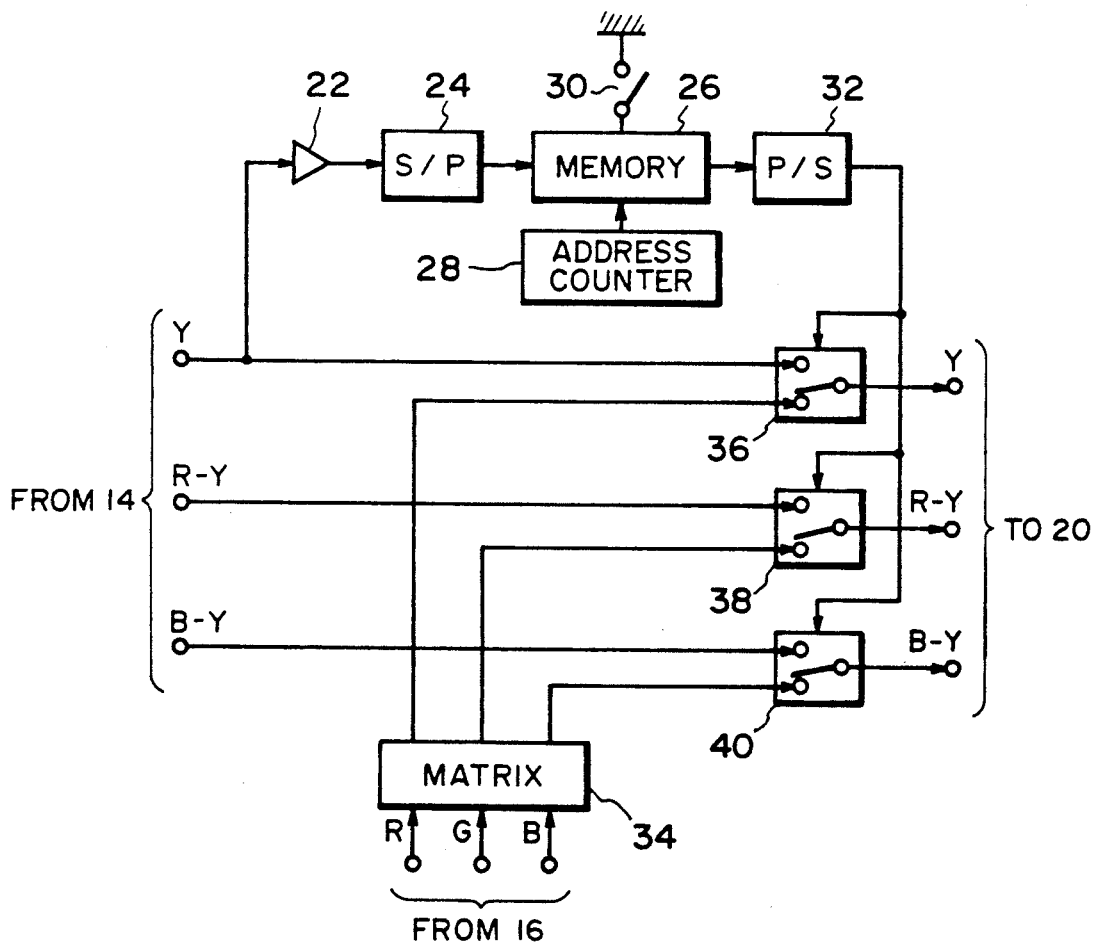
FIG. 2 is a block diagram showing a particular example of the title insertion circuit 18 shown in FIG. 1.

FIG. 2 is a block diagram showing an example of the circuit arrangement of the title insertion circuit 18. A comparator 22 binarizes a luminance signal from the processing circuit 14. A serial/parallel (S/P) converter 24 converts a serial signal into a parallel signal. A title memory 26 stores a title image. An address counter 28 generates an address of the title memory 26. A switch 30 instructs to store a binary image into the title memory 26. A parallel/serial (P/S) converter 32 converts parallel data read from the title memory 26 into serial data. A matrix circuit 34 converts RGB signals from the color pattern generator 16 into a luminance signal Y, and color difference signals R-Y and B-Y. Analog switches 36, 38, and 40 select either output signals of the processing circuit (i.e., video signals of a taken image) or output signals of the matrix circuit 34 (i.e., color pattern signals of a title image).

The operation of storing a title image in the title memory 26 will be described with reference to FIG. 2.

The luminance signal outputted from the processing circuit 14 is binarized by the comparator 22, and then supplied to the S/P circuit 24 to obtain an 8 bit parallel signal. When the switch 30 is turned on, an output of the S/P circuit 24, i.e., image data (pattern signal) obtained by binarizing the luminance signal of a taken image, is stored sequentially in unit of one frame into the title memory 26.

In inserting a title image stored in the title memory 26 into a taken image, the following operations are performed. Specifically, data read from the title memory 26 under the control of the address counter 52 is converted back into a serial signal constituting a title signal at the P/S converter 32, the title signal controlling the analog switches 36, 38, and 40. The color pattern generator 16 generates a designated color pattern in synchronism with the video signal of the above-described taken image. The matrix circuit 34 converts the color pattern represented by RGB signals into Y, R-Y, and B-Y signals which are then supplied to the analog switches 36, 38, and 40. The analog switches 36, 38, and 40 are switched by the title signals so that the title image having the color pattern generated by the color pattern generator 16 is written over the image supplied from the processing circuit to thereby superpose the former upon the latter.

Figure 4A:
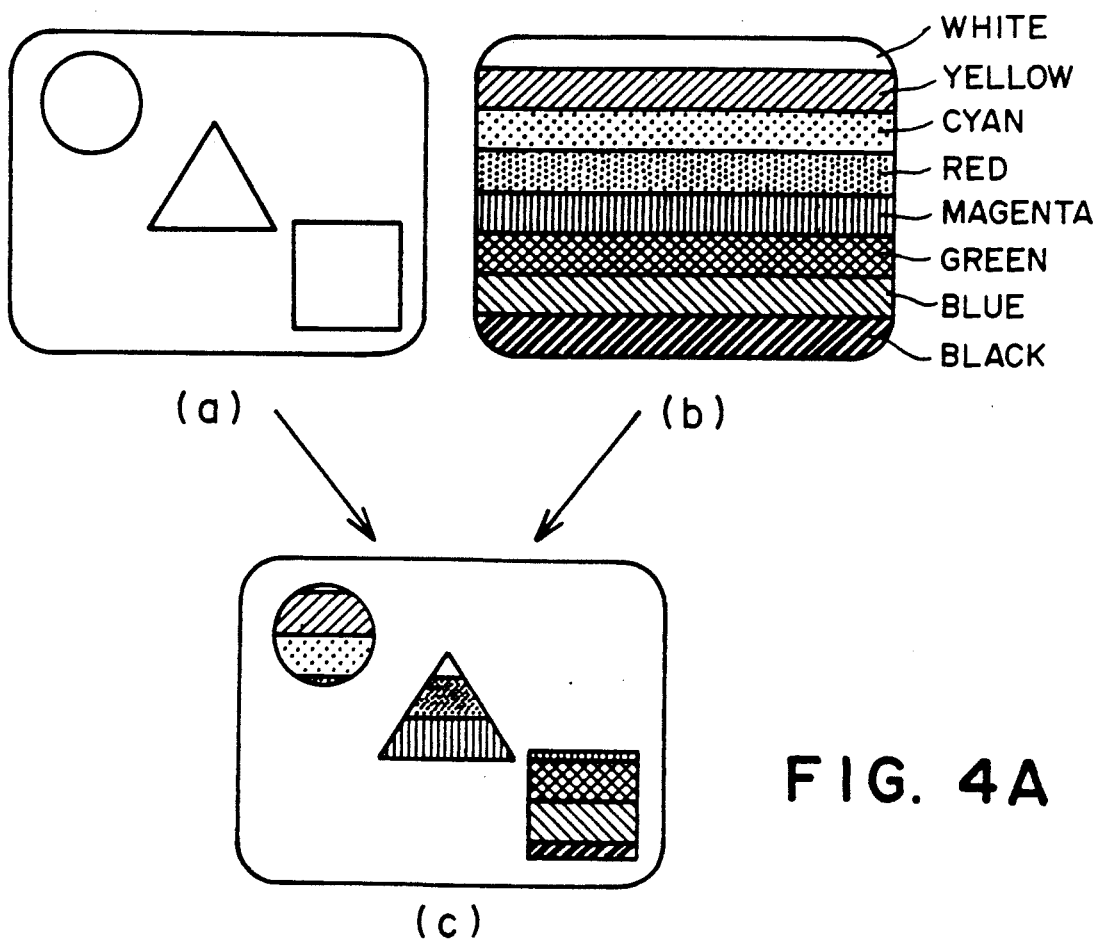
FIGS. 4A and 4B show an example of a displayed title using the color pattern generator shown in FIG. 3, and a timing chart.
Figure 4B:
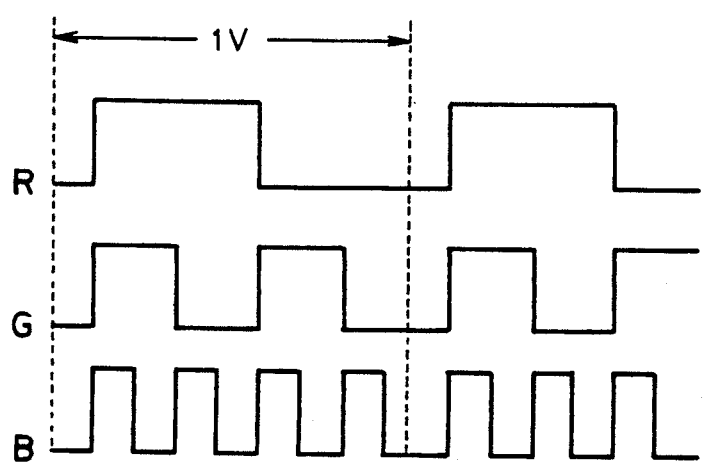

FIG. 3 is a block diagram showing an example of the circuit arrangement of the color pattern generator 16. A counter 42 counts up the horizontal synchro pulse HD from SSG 15, and is cleared by the vertical synchro pulse VD from SSG 15. A decoder 44 outputs a digital signal for designating a color when the count of the counter 42 reaches a predetermined value. A D/A converter 46 converts an output of the decoder 44 into an analog signal to thereby output RGB signals. RGB signals outputted from the D/A converter 46 are the output of the color pattern generator 16. The circuit shown in FIG. 3 outputs RGB signals such as shown in FIG. 4B. The color pattern for these RGB signals is such as indicated at (b) in FIG. 4A having stepwise changed colors in the vertical direction. If the title image stored in the title memory 26 is graphics such as indicated at (a) in FIG. 4A, the resultant image with the color pattern indicated at (b) in FIG. 4A being added thereto becomes graphics such as indicated at (c) in FIG. 4A which are then superposed upon the taken image.

In FIG. 4B, output timings of RGB signals from the D/A converter 46 have a definite relation to the vertical synchro signal. If the output timings of RGB signals are shifted relative to the vertical synchro signal, the generated color pattern moves up and down.

It is needless to say that a more complicated color pattern may be generated by using a microcomputer instead of the decoder 44 and processing the output of the counter 42. Furthermore, by using analog RGB signals, a color pattern gradually and continuously changing its color can be generated.

According to this embodiment, a title image can be expressed with multiple colors as compared with a conventional single color. Furthermore, by moving a color pattern, a change of colors can be provided, to thereby emphasize the title image.

FIG. 5 is a block diagram showing another example of the circuit arrangement of the color pattern generator 16. Reference numeral 50 represents a random access memory, and reference numeral 52 represents an address counter for generating an address signal for the memory 50 in accordance with the horizontal synchro signal HD and vertical synchro signal VD. The memory 50 is connected via a connector 54 to an external memory 56 such as an ID card. The external memory 56 stores data representative of a texture pattern such as a light blue spot pattern. Reference numeral 58 represents a D/A converter for converting data read from the memory 50 into an analog signal. The outputs of the D/A converter 58 constitute RGB signals representative of a color pattern.

When the external memory 56 is connected via the connector 54 to the memory 50, the data in the external memory 56 is transferred to the memory 50 via the connector 54. The number of colors represented by the data transferred from the external memory 56 to the memory 50 is not limited to eight colors, but it may be 64 colors represented by analog RGB signals. The texture data stored in the memory 50 is sequentially read under the control of the address counter 52, converted into analog signals by the D/A converter 58, and supplied to the title insertion circuit 18 as RGB color pattern signals.

Use of the color pattern generator shown in FIG. 5 allows for fetching color pattern signals from the external, so that there is no limit of the number of available color patterns. Not only a title image previously taken, but also a generated color pattern are provided so that a viewer can enjoy a colorful title image.

As readily appreciated from the foregoing description of this invention, a title image can be displayed with multiple colors thereby emphasizing the title image. Furthermore, by using a color pattern supplied from an external storage, a title image can be displayed with more colors and patterns.

I claim:

1. A video signal processing apparatus, comprising:
   (a) means for inputting a video signal;
   (b) binary image generating means for generating a binary image signal;
   (c) color pattern generating means for generating color pattern information in synchronism with said video signal; and
   (d) synthesizing means for coloring said binary image signal using said color pattern information and synthesizing said colored binary image signal with said video signal.

2. An apparatus according to claim 1, wherein said binary image generating means includes binarizing means for binarizing a luminance signal in said video signal, and memory means for storing said binarized luminance signal.

3. An apparatus according to claim 1, wherein said synthesizing means includes switching means for selectively outputting said video signal and said color pattern signal in accordance with said binary signal.

4. An apparatus according to claim 1, wherein said color pattern generating means includes counting means for counting a synchro singal synchronized with said video signal, a digital circuit for generating digital color pattern information which changes with an output from said counting means, and a converting circuit for converting an output of said digital circuit into an analog color video signal.

5. An apparatus according to claim 1, wherein said color pattern generating means includes a memory for storing one frame of predetermined digital color pattern information, address controlling means for controlling a read address of said memory in accordance with a synchro signal synchronized with said video signal, and a converter circuit for converting said digital color pattern information read from said memory into an analog color video signal.

6. An apparatus according to claim 5, wherein said color pattern generating means further includes rewriting means for rewriting said digital color pattern information stored in said memory.

7. An apparatus according to claim 1, wherein said input means includes image pickup means for converting a subject image into an electrical signal, and signal processing means for generating said video signal by using said electrical signal converted by said image pickup means.

8. An apparatus according to claim 7, further comprising timing control means for controlling the operation timing of said image pickup means, and syncro signal generating means for generating a vertical synchro signal and a horizontal synchro signal of said video signal in response to the operation of said timing control means.

9. An apparatus according to claim 8, wherein said color pattern generating means generates said color information using the vertical and horizontal synchro signals generated by said synchro signal generating means.

10. A video signal processing apparatus, comprising:
    (a) binary image generating means for generating a binary image signal;
    (b) a memory for storing one frame of predetermined digital color patter information;
    (c) rewriting means for rewriting said digital color pattern information stored in said memory; and
    (d) coloring means for coloring said binary image signal by using said digital color pattern information read from said memory.

11. A video signal processing apparatus according to claim 10, wherein said coloring means includes a converter circuit for converting said digital color pattern information read from said memory into an analog color video signal, and switching means for selectively outputting said analog color video signal and another video signal in accordance with said binary image signal.

* * * * *